Figure 1:
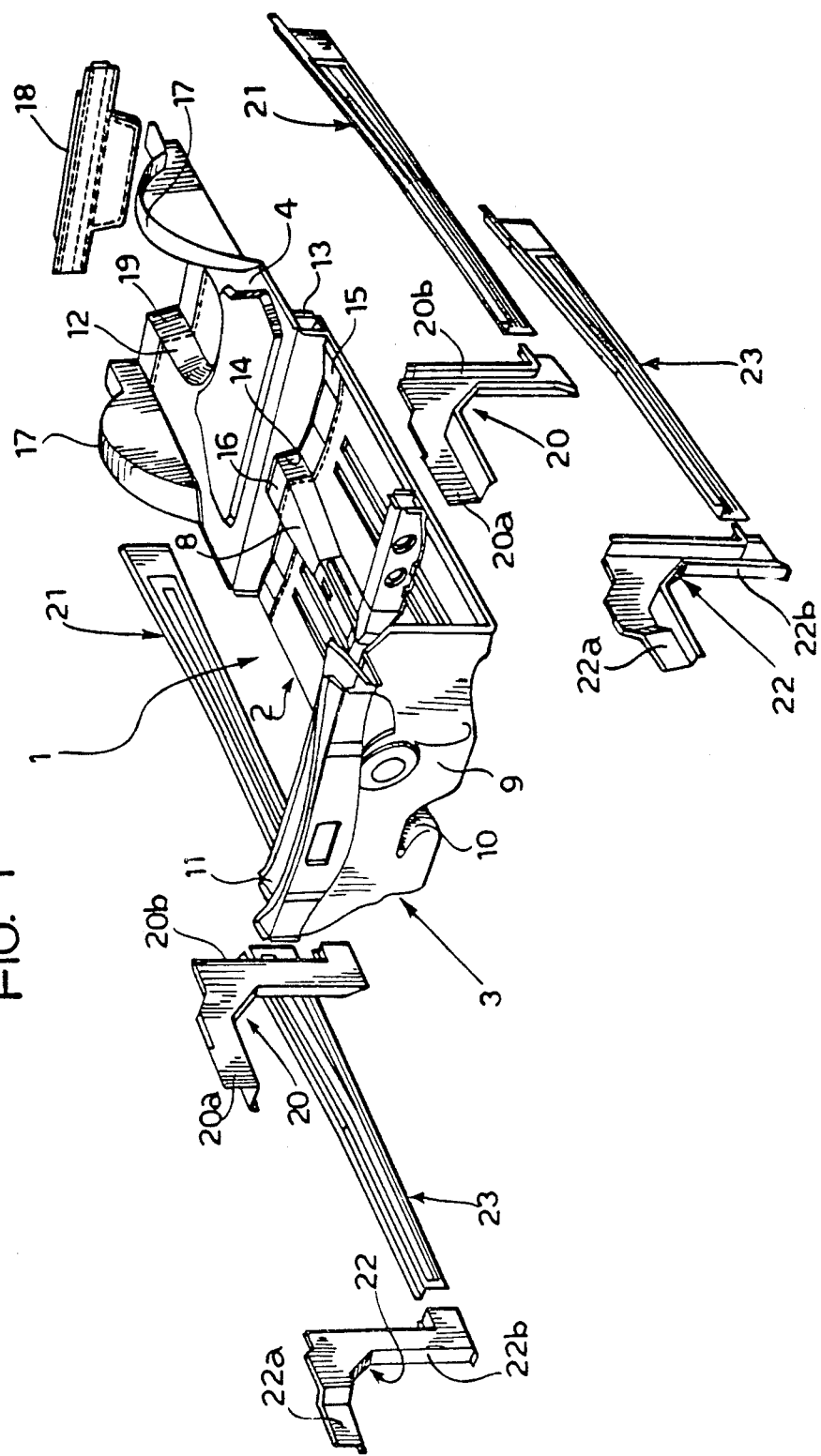

United States Patent [19]

Filtri et al.

[11] Patent Number: 4,865,378

[45] Date of Patent: Sep. 12, 1989

[54] MODULAR BODY ELEMENT FOR MOTOR CARS

[75] Inventors: Luigi Filtri, Turin; Luigi Prato, Villarbasse, both of Italy

[73] Assignee: Fiat Auto S.p.A., Turin, Italy

[21] Appl. No.: 210,438

[22] Filed: Jun. 23, 1988

[30] Foreign Application Priority Data

Jun. 23, 1987 [IT] Italy .............................. 67543 A/87

[51] Int. Cl.$^4$ ............................................. B62D 25/00
[52] U.S. Cl. .................................... 296/197; 296/204; 29/401.1
[58] Field of Search ............... 296/197, 204, 196, 193, 296/185; 29/401.1

[56] References Cited

U.S. PATENT DOCUMENTS

| 4,231,144 | 11/1980 | Bernacchia, Jr. | 29/401.1 |
| 4,342,146 | 8/1982 | Hanson | 29/401.1 |
| 4,422,685 | 12/1983 | Bonfili et al. | 296/197 |
| 4,509,700 | 4/1985 | Nagamoto et al. | 296/204 |
| 4,654,946 | 4/1987 | Phillips | 29/401.1 |
| 4,730,870 | 3/1988 | DeRees | 296/197 |

Primary Examiner—Robert R. Song
Attorney, Agent, or Firm—Sughrue, Mion, Zinn, Macpeak & Seas

[57] ABSTRACT

A body element for the production of modular bodies for use in the manufacture of cars of the same model or different models, with specific wheelbases, tracks, styles, versions and power units. The body element comprises a common horizontal floor and means selectively applicable to the floor to extend and reduce the body element longitudinally and transversely.

5 Claims, 3 Drawing Sheets

MODULAR BODY ELEMENT FOR MOTOR CARS

The present invention relates in general to motor car bodies.

In the field of automotive construction, each manufacturer generally provides various ranges of cars, each of which includes several versions of a particular model which normally differ from each other in having different power units, bodywork and equipment. In such cases, in order to produce different versions of the same model, it is necessary also to provide variations in wheelbase and track. In this case, according to current technology, it is necessary to provide various bodies with differing lengths and/or widths, or to use the bodies designed for the larger versions for the smaller versions as well, with obvious disadvantages arising in this case from unnecessary over-dimensioning of the bodies.

The object of the present invention is to avoid these disadvantages by means of a body element to be used for the production of modular motor car bodies which are easily adaptable by simple devices to the various dimensions of a multiplicity of cars of the same model, or even for different models and ranges.

According to the invention, this object is achieved by means of a body element for the production of modular bodies, characterised in that it comprises a standard horizontal floor and means selectively applicable to the floor to extend and reduce the body element longitudinally and transversely.

Preferably, the floor has a front end to which a vertical firewall structure is fixed, and a rear end arranged for the selective application of a longitudinal extension serving to lengthen the wheelbase of the car using the body element, the body element further including a rear platform fixed to the rear end of the floor directly or by means of the extension.

Conveniently, the body element according to the invention further includes an end extension selectively applicable to the rear end of the rear platform to length the rear overhang of the car using the body element.

According to the invention, the body element further includes, conveniently, first and second pairs of interchangeable uprights selectively fixable to the front end of the floor in correspondence with the opposite ends of the firewall structure, and first and second pairs of interchangeable horizontal reinforcing plates selectively fixable to the sides of the floor starting from these uprights, the uprights and the reinforcing plates of the first pair having a greater lateral extent than the uprights and the reinforcing plates of the second pair.

In practice, the body element according to the invention consists of two groups of standard elements (the floor, firewall structure and rear platform on the one hand, the longitudinal -extension, end extension, uprights and reinforcing plates on the other) which can be combined with each other in different ways so as to cover, in a practical, simple and functional manner, the various dimensional possibilities in terms of wheelbase and track encompased by the different versions of the same model, or even by different models of car. Furthermore, the body element according to the invention readily lends itself to automated assembly techniques, both of its components and of other body elements (bodywork elements, structural sub-units, etc.) for making up the car.

Figure 2:
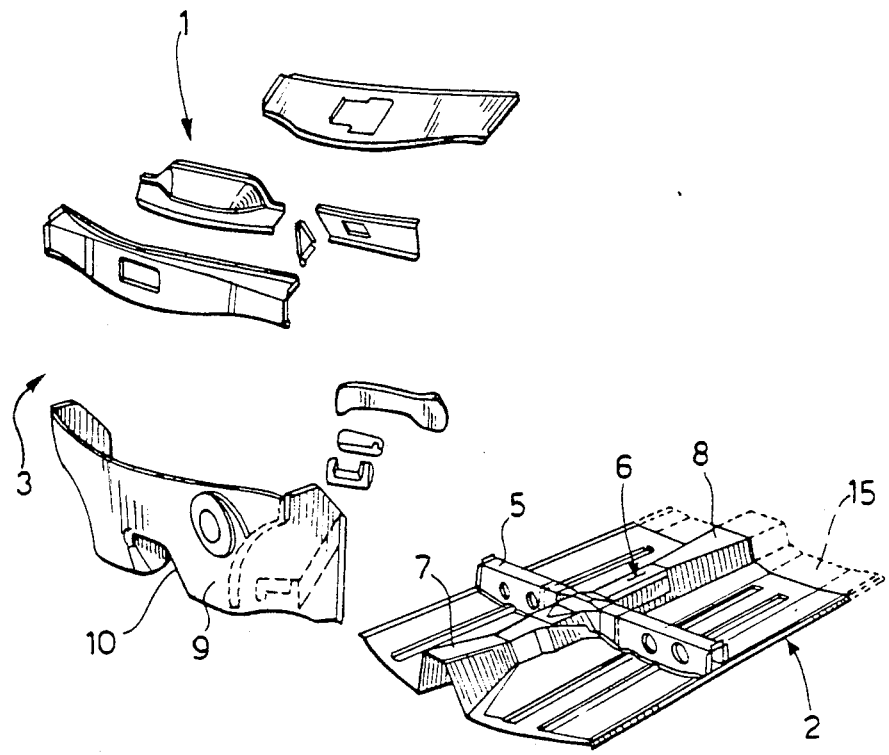

The invention will now be described in detail with reference to the appended drawings, provided purely by way of non-limiting example, in which:

FIG. 1 is a partially exploded perspective view of a body element for motor cars according to the invention, FIG. 2 is an exploded perspective view of part of the body element of FIG. 1, and FIGS. 3 to 7 show five different alternative configurations of the body element according to the invention, in perspective and on a reduced scale.

With reference initially to FIG. 1, a body element for motor cars according to the invention is indicated 1 and consists essentially of a horizontal floor 2 having a vertical firewall structure 3 fixed to its front end, and a rear platform 4, also horizontal, extending from its rear end. As can better be seen from FIG. 2, the floor 2 consists of a generally rectangular plate having a channel-shaped central transverse stiffening member 5 and a central longitudinal stiffener 6 which is also channel shaped and has enlarged front and rear ends 7 and 8 respectively.

The firewall structure 3 is constituted by a shaped plate 9 having a central recess 10 engaged astride the front end 7 of the stiffener 6 of the floor 2. The lower side of the plate 9 is welded to the front end of the floor 2, while its upper end supports a series of elements, generally indicated 11, forming a dashboard.

The above-described components of the body element 1 are standard and identical for all the possible versions thereof which will be described below.

The rear platform 4 consists of a plate having a rear recess 12 (intended to accommodate the spare wheel of the car) and a frontal transverse box-stiffener 13 having a central recess 14 and fixed to the rear end of the floor 2. This fixing can be achieved directly (in the manner shown in FIGS. 3 and 6), in which case the central recess 14 of the box part 13 is positioned astride the rear end 8 of the longitudinal stiffener 6 of the floor 2, or indirectly through a longitudinal extension 15 (in the manner illustrated in FIGS. 1, 4, 5 and 7). This longitudinal extension 15 has a central raised portion 16 for engagement astride the end 8 of the stiffener 6 and, in practice, has the function of lengthening the body element 1 and thus the wheelbase of the car using the element.

Two wheel-arch elements 17 are fixed to the sides of the rear platform 4 and a transverse plate 18 is fixed to its rear end. The plate may be fixed to the rear platform directly or with the interposition of an end extension 19 whose function is to lengthen the overhang of the rear platform 4.

In addition to the ability to vary the length of the body element 1 by means of the selective use of the extension 15 and/or the extension 19, it is also possible to vary the width of the element by means of the selective use of a first pair of uprights 20 and relative lateral reinforcing plates 21 or a second pair of uprights 22 and relative lateral reinforcing plates 23. The uprights 20, 22 are adapted to be fixed to the ends of the firewall structure 3 in correspondence with the front end of the floor 2, and the reinforcing plates 21, 23 are arranged to be fitted in correspondence with the lateral edges of the floor 2, starting from the bases of the corresponding uprights 20, 22 respectively. Each of these uprights 20, 22 has an upper horizontal arm 20a, 22a facing forwards and arranged for the mechanized fixing of a front frame carrying the power unit of the car, and a lower vertical arm 20b, 22b to which the front end of the respective corresponding reinforcing plate 21, 23 is connected.

The uprights 20 and the reinforcing plates 21 differ from the uprights 22 and the reinforcing plates 23 respectively only in depth or lateral extent, which is smaller in the former ones and less in the latter ones. Clearly, therefore, the width of the body element 1 may be varied by means of the selective application of one or the other.

FIGS. 3 to 7 show the various configurations of the body element 1 which can be produced by means of the possible combinations of the above-described components.

Figure 3:
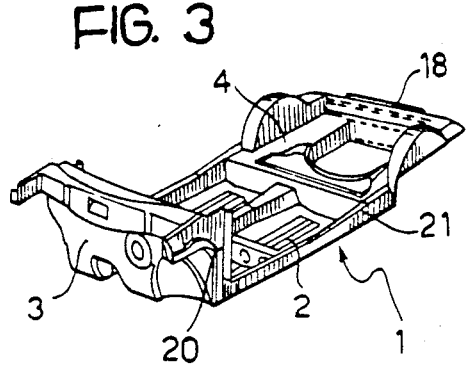
Figure 4:
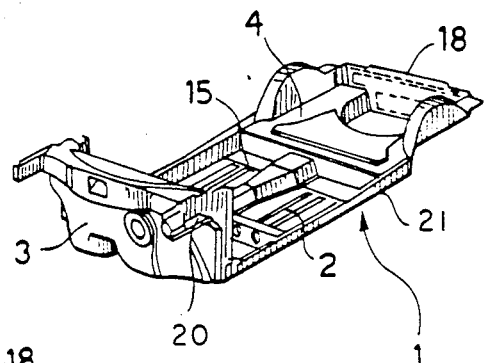

FIG. 3 corresponds to the shortest and narrowest configuration in which the extensions 15 and 19 are not used and in which the uprights 20 and the reinforcing plates 21 are used. FIG. 4 shows the narrowest configuration lengthened and differs from the preceding one only in the application of the extension 15.

Figure 5:
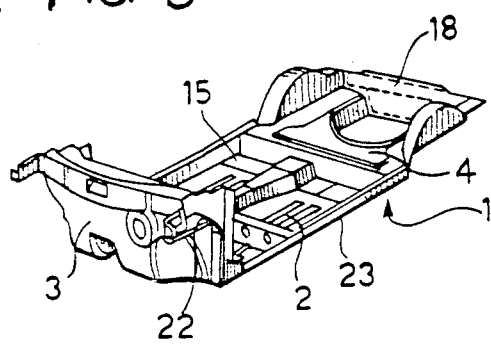

In the case of FIG. 5, the widest lengthened configuration is shown and corresponds to that of FIG. 4 but uses the uprights 22 and the reinforcing plates 23 instead of the uprights 20 and the reinforcing plates 21.

Figure 6:
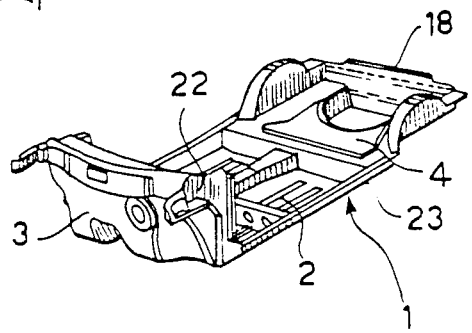

The configuration of FIG. 6 is the widest and shortest and corresponds to that of FIG. 3 but uses the uprights 22 and the reinforcing plates 23 instead of the uprights 20 and the reinforcing plates 21.

Figure 7:
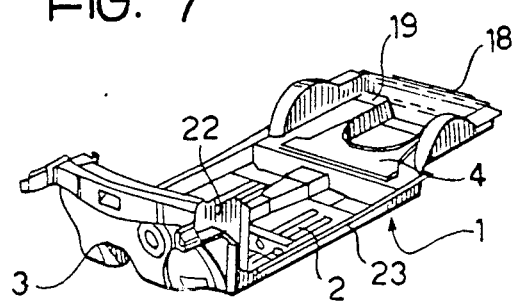

Finally, FIG. 7 shows the widest and longest configuration with an overhang, which corresponds to that of FIG. 5 with the addition of the end extension 19.

Following assembly (normally carried out by welding) of the body element 1 in the manner described above, the body is completed by the fitting of the specific components of the bodywork (roof panel, side panels, doors, wings, etc.) and the mounting of the power units and other mechanical parts.

We claim:

1. A body element for the production of modular bodies for use in the manufacture of motor cars of the same model or different models, with specific wheelbases, tracks, styles, versions and power units, comprising a standard horizontal floor (2) and means (15, 20, 21, 22, 23) selectively applicable to the floor (2) to extend and reduce the body element (1) longitudinally and transversely.

2. A body element according to claim 1, wherein the floor (2) has a front end and a rear end, comprising a vertical firewall structure (S) fixed to the front end of the floor (2) and a longitudinal extension (15) arranged for the selective application to the rear end of the floor (2) and serving to lengthen the wheelbase of the car using the body element (1), and in that it also includes a rear platform (4) fixed to the rear end of the floor (2) directly or by means of the longitudinal extension (15).

3. A body element according to claim 1, further including an end extension (19) selectively applicable to the rear end of the rear platform (4) to lengthen the rear overhang of the car using the body element (1).

4. A body element according to claim 2, including first and second pairs of interchangeable uprights (20, 22) selectively fixable to the front end of the floor (2) in correspondence with the opposite ends of the firewall structure (S), and first and second pairs of interchangeable horizontal reinforcing plates (21, 23) selectively fixable to the sides of the floor (2) starting from the uprights (20, 22), the uprights and reinforcing plates of the first pair (20, 21) having a smaller lateral extent than the uprights and reinforcing plates of the second pair (22, 23).

5. A body element according to claim 4, wherein each upright (20, 22) consists of an inverted L-shaped structure having an upper horizontal arm (20a, 22b) to which the front end of the corresponding reinforcing plate (21, 23) is connected.

* * * * *